US008751513B2

(12) United States Patent
Priyadarshan et al.

(10) Patent No.: US 8,751,513 B2
(45) Date of Patent: Jun. 10, 2014

(54) INDEXING AND TAG GENERATION OF CONTENT FOR OPTIMAL DELIVERY OF INVITATIONAL CONTENT

(75) Inventors: Eswar Priyadarshan, West Roxbury, MA (US); Kenley Sun, Cambridge, MA (US); Dan Marius Grigorovici, Pleasanton, CA (US); Jayasurya Vadrevu, Lexington, MA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 12/873,250

(22) Filed: Aug. 31, 2010

(65) Prior Publication Data
US 2012/0054209 A1    Mar. 1, 2012

(51) Int. Cl.
*G06F 17/30* (2006.01)

(52) U.S. Cl.
USPC ..... 707/753; 705/14.4; 705/14.49; 705/14.66

(58) Field of Classification Search
USPC .................. 707/753; 705/14.4, 14.49, 14.66
See application file for complete search history.

(56) References Cited

U.S. PATENT DOCUMENTS

| | | | |
|---|---|---|---|
| 4,829,423 A | 5/1989 | Tennant et al. | |
| 4,879,648 A | 11/1989 | Cochran et al. | |
| 5,062,074 A | 10/1991 | Kleinberger | |
| 5,270,689 A | 12/1993 | Hermann | |
| 5,408,519 A | 4/1995 | Pierce et al. | |
| 5,544,360 A | 8/1996 | Lewak et al. | |
| 5,613,213 A | 3/1997 | Naddell et al. | |
| 5,708,825 A | 1/1998 | Sotomayor | |
| 5,867,164 A | 2/1999 | Bornstein et al. | |
| 5,907,841 A | 5/1999 | Sumita et al. | |
| 5,943,657 A | 8/1999 | Freestone et al. | |
| 5,978,775 A | 11/1999 | Chen | |
| 5,978,833 A | 11/1999 | Pashley et al. | |
| 5,978,841 A | 11/1999 | Berger | |
| 5,991,713 A | 11/1999 | Unger et al. | |

(Continued)

FOREIGN PATENT DOCUMENTS

| | | |
|---|---|---|
| DE | 19941461 | 3/2001 |
| DE | 10061984 | 6/2002 |

(Continued)

OTHER PUBLICATIONS

"Communication Pursuant to Article 94(3) EPC", issued in connection with related European Patent Application No. 07824933.1 and mailed Oct. 13, 2009.

(Continued)

*Primary Examiner* — Joshua Bullock
(74) *Attorney, Agent, or Firm* — Novak Druce Connolly Bove + Quigg LLP

(57) ABSTRACT

The present technology is directed to improving the conversion rate of invitational content that is provided to the user of an interactive, content-receiving-and-displaying device. The content of a large number of primary-content sources is analyzed and keyword and/or other context-providing information is extracted from the primary-content sources. The keyword and/or other context-providing information is used to index the primary-content sources into an index according to a hierarchical taxonomy; the hierarchical taxonometric index is used to identify primary-content sources with which a given item of invitational content correlates; and the given item of invitational content is delivered to a user in response to the user accessing a primary-content source with which the given item of invitational content correlates.

15 Claims, 7 Drawing Sheets

(56) References Cited

U.S. PATENT DOCUMENTS

| | | | |
|---|---|---|---|
| 6,023,700 A | 2/2000 | Owens et al. | |
| 6,023,701 A | 2/2000 | Malik et al. | |
| 6,055,512 A | 4/2000 | Dean et al. | |
| 6,073,143 A | 6/2000 | Nishikawa et al. | |
| 6,078,914 A | 6/2000 | Redfern | |
| 6,097,942 A | 8/2000 | Laiho | |
| 6,138,113 A | 10/2000 | Dean et al. | |
| 6,148,334 A | 11/2000 | Imai et al. | |
| 6,178,460 B1 | 1/2001 | Maddalozzo, Jr. et al. | |
| 6,182,065 B1 | 1/2001 | Yeomans | |
| 6,256,648 B1 | 7/2001 | Hill et al. | |
| 6,334,145 B1 | 12/2001 | Adams et al. | |
| 6,345,279 B1 | 2/2002 | Li et al. | |
| 6,381,465 B1 | 4/2002 | Chern et al. | |
| 6,405,243 B1 | 6/2002 | Nielsen | |
| 6,658,464 B2 | 12/2003 | Reisman | |
| 6,684,249 B1 | 1/2004 | Frerichs et al. | |
| 6,690,394 B1 | 2/2004 | Harui | |
| 6,754,470 B2 | 6/2004 | Hendrickson et al. | |
| 6,850,530 B1 | 2/2005 | Waclawsky et al. | |
| 6,920,326 B2 | 7/2005 | Agarwal et al. | |
| 7,058,695 B2 | 6/2006 | Takagi et al. | |
| 7,072,947 B1 | 7/2006 | Knox et al. | |
| 7,149,537 B1 | 12/2006 | Kupsh et al. | |
| 7,194,552 B1 | 3/2007 | Schneider | |
| 7,490,045 B1 | 2/2009 | Flores et al. | |
| 7,558,559 B2 | 7/2009 | Alston | |
| 7,613,691 B2 | 11/2009 | Finch | |
| 2001/0047272 A1 | 11/2001 | Frietas et al. | |
| 2002/0016736 A1 | 2/2002 | Cannon et al. | |
| 2002/0077130 A1 | 6/2002 | Owensby | |
| 2002/0078147 A1 | 6/2002 | Bouthors et al. | |
| 2002/0083411 A1 | 6/2002 | Bouthors et al. | |
| 2002/0120565 A1 | 8/2002 | Yu et al. | |
| 2002/0120682 A1 | 8/2002 | Funaki | |
| 2002/0137507 A1 | 9/2002 | Winkler | |
| 2002/0138291 A1 | 9/2002 | Vaidyanathan et al. | |
| 2002/0175935 A1 | 11/2002 | Wang et al. | |
| 2003/0003935 A1 | 1/2003 | Vesikivi et al. | |
| 2003/0013483 A1 | 1/2003 | Ausems et al. | |
| 2003/0028896 A1 | 2/2003 | Swart et al. | |
| 2003/0040297 A1 | 2/2003 | Pecen et al. | |
| 2003/0040300 A1 | 2/2003 | Bodic et al. | |
| 2003/0080986 A1 | 5/2003 | Baird | |
| 2003/0154300 A1 | 8/2003 | Mostafa | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2003/0208472 A1 | 11/2003 | Pham | |
| 2004/0010592 A1 | 1/2004 | Carver et al. | |
| 2004/0034647 A1 | 2/2004 | Paxton et al. | |
| 2004/0043777 A1 | 3/2004 | Brouwer et al. | |
| 2004/0054576 A1 | 3/2004 | Kanerva et al. | |
| 2004/0068527 A1 | 4/2004 | Smith, III | |
| 2004/0122926 A1 | 6/2004 | Moore et al. | |
| 2004/0136358 A1 | 7/2004 | Hind et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0240649 A1 | 12/2004 | Goel | |
| 2004/0259526 A1 | 12/2004 | Goris et al. | |
| 2005/0010641 A1 | 1/2005 | Staack | |
| 2005/0044280 A1 | 2/2005 | Reisman | |
| 2005/0060425 A1 | 3/2005 | Yeh et al. | |
| 2005/0114229 A1 | 5/2005 | Ackley et al. | |
| 2005/0125397 A1 | 6/2005 | Gross et al. | |
| 2005/0138140 A1 | 6/2005 | Wen et al. | |
| 2005/0191989 A1 | 9/2005 | Plush et al. | |
| 2005/0249216 A1 | 11/2005 | Jones | |
| 2005/0289113 A1 | 12/2005 | Bookstaff | |
| 2006/0029097 A1 | 2/2006 | McGee et al. | |
| 2006/0031327 A1 | 2/2006 | Kredo | |
| 2006/0045245 A1 | 3/2006 | Aaron et al. | |
| 2006/0059133 A1 | 3/2006 | Moritani | |
| 2006/0073810 A1 | 4/2006 | Pyhalammi et al. | |
| 2006/0095511 A1 | 5/2006 | Munarriz et al. | |
| 2006/0123014 A1 | 6/2006 | Ng | |
| 2006/0129455 A1 | 6/2006 | Shah | |
| 2006/0141923 A1 | 6/2006 | Goss | |
| 2006/0143027 A1 | 6/2006 | Jagannathan et al. | |
| 2006/0161520 A1 | 7/2006 | Brewer et al. | |
| 2006/0194595 A1 | 8/2006 | Myllynen et al. | |
| 2006/0200460 A1 | 9/2006 | Meyerzon et al. | |
| 2006/0200461 A1 | 9/2006 | Lucas et al. | |
| 2006/0200541 A1 | 9/2006 | Wikman et al. | |
| 2006/0206586 A1 | 9/2006 | Ling et al. | |
| 2006/0223495 A1 | 10/2006 | Cassett et al. | |
| 2006/0276170 A1 | 12/2006 | Radhakrishnan et al. | |
| 2006/0276213 A1 | 12/2006 | Gottschalk et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0004333 A1 | 1/2007 | Kavanti | |
| 2007/0030824 A1 | 2/2007 | Ribaudo et al. | |
| 2007/0047523 A1 | 3/2007 | Jiang | |
| 2007/0072631 A1 | 3/2007 | Mock et al. | |
| 2007/0073624 A1 | 3/2007 | Ishibashi et al. | |
| 2007/0074262 A1 | 3/2007 | Kikkoji et al. | |
| 2007/0083602 A1 | 4/2007 | Heggenhougen et al. | |
| 2007/0088687 A1 | 4/2007 | Bromm et al. | |
| 2007/0088801 A1 | 4/2007 | Levkovitz et al. | |
| 2007/0088851 A1 | 4/2007 | Levkovitz et al. | |
| 2007/0100805 A1 | 5/2007 | Ramer et al. | |
| 2007/0105536 A1 | 5/2007 | Tingo, Jr. | |
| 2007/0117571 A1 | 5/2007 | Musial | |
| 2007/0149208 A1 | 6/2007 | Syrbe et al. | |
| 2007/0150483 A1 | 6/2007 | Goldman et al. | |
| 2007/0168336 A1 | 7/2007 | Ransil et al. | |
| 2007/0179841 A1 | 8/2007 | Agassi et al. | |
| 2007/0180147 A1 | 8/2007 | Leigh | |
| 2007/0214048 A1* | 9/2007 | Chan et al. | 705/14 |
| 2007/0214132 A1 | 9/2007 | Grubb et al. | |
| 2007/0220040 A1* | 9/2007 | Do | 707/102 |
| 2007/0244750 A1* | 10/2007 | Grannan et al. | 705/14 |
| 2007/0287474 A1 | 12/2007 | Jenkins et al. | |
| 2007/0290787 A1 | 12/2007 | Fiatal et al. | |
| 2007/0300160 A1* | 12/2007 | Ferrel et al. | 715/744 |
| 2008/0004046 A1 | 1/2008 | Mumick et al. | |
| 2008/0013537 A1 | 1/2008 | Dewey et al. | |
| 2008/0032703 A1 | 2/2008 | Krumm et al. | |
| 2008/0032717 A1 | 2/2008 | Sawada et al. | |
| 2008/0070579 A1 | 3/2008 | Kankar et al. | |
| 2008/0071875 A1 | 3/2008 | Koff et al. | |
| 2008/0082686 A1 | 4/2008 | Schmidt et al. | |
| 2008/0091796 A1 | 4/2008 | Story et al. | |
| 2008/0109285 A1* | 5/2008 | Reuther et al. | 705/7 |
| 2008/0155588 A1 | 6/2008 | Roberts et al. | |
| 2008/0201731 A1* | 8/2008 | Howcroft | 725/13 |
| 2008/0243619 A1 | 10/2008 | Sharman et al. | |
| 2008/0270151 A1* | 10/2008 | Mahoney et al. | 705/1 |
| 2008/0281696 A1 | 11/2008 | Whitehead | |
| 2008/0288476 A1 | 11/2008 | Kim et al. | |
| 2009/0063279 A1 | 3/2009 | Ives et al. | |
| 2009/0113468 A1 | 4/2009 | Steelberg et al. | |
| 2009/0144124 A1* | 6/2009 | Surendran et al. | 705/10 |
| 2009/0164299 A1 | 6/2009 | Gupta et al. | |
| 2009/0164300 A1 | 6/2009 | Gupta et al. | |
| 2009/0222440 A1* | 9/2009 | Hantke et al. | 707/5 |
| 2009/0275315 A1 | 11/2009 | Alston | |
| 2010/0005488 A1 | 1/2010 | Rakib et al. | |
| 2010/0138452 A1 | 6/2010 | Henkin et al. | |
| 2010/0293058 A1* | 11/2010 | Maher et al. | 705/14.66 |
| 2010/0312572 A1* | 12/2010 | Ramer et al. | 705/1.1 |
| 2011/0238495 A1* | 9/2011 | Kang | 705/14.49 |
| 2011/0239246 A1* | 9/2011 | Woodward et al. | 725/35 |

FOREIGN PATENT DOCUMENTS

| | | |
|---|---|---|
| EP | 0597630 | 5/1994 |
| EP | 1061465 | 12/2000 |
| EP | 1073293 | 1/2001 |

(56) References Cited

FOREIGN PATENT DOCUMENTS

| | | |
|---|---|---|
| EP | 1109371 | 6/2001 |
| EP | 1220132 | 7/2002 |
| EP | 1239392 | 9/2002 |
| EP | 1365604 | 11/2003 |
| EP | 1408705 | 4/2004 |
| EP | 1455511 | 9/2004 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| GB | 2369218 | 5/2002 |
| GB | 2406996 | 4/2005 |
| GB | 2414621 | 11/2005 |
| JP | 2002-14272 | 5/2002 |
| JP | 2007-087138 | 4/2007 |
| JP | 2007-199821 | 8/2007 |
| WO | 96/24213 | 8/1996 |
| WO | 00/30002 | 5/2000 |
| WO | 00/44151 | 7/2000 |
| WO | 01/22748 | 3/2001 |
| WO | 01/31497 | 5/2001 |
| WO | 01/52161 | 7/2001 |
| WO | 01/57705 | 8/2001 |
| WO | 01/58178 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/31624 | 4/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/086791 | 10/2004 |
| WO | 2004/00470 | 11/2004 |
| WO | 2004/100521 | 11/2004 |
| WO | 2004/102993 | 11/2004 |
| WO | 2004/104867 | 12/2004 |
| WO | 2005/029769 | 3/2005 |
| WO | 2005/076650 | 8/2005 |
| WO | 2006/002869 | 1/2006 |
| WO | 2006/005001 | 1/2006 |
| WO | 2006/016189 | 2/2006 |
| WO | 2006/027407 | 3/2006 |
| WO | 2006/040749 | 4/2006 |
| WO | 2006/093284 | 9/2006 |
| WO | 2006/119481 | 11/2006 |
| WO | 2008/013437 | 1/2008 |
| WO | 2008/045867 | 4/2008 |
| WO | 2008/147919 | 12/2008 |

OTHER PUBLICATIONS

"Communication Pursuant to Article 94(3) EPC", issued in connection with related European Patent Application No. 08153658.3 and mailed Sep. 21, 2009.
"Communication Pursuant to Article 94(3) EPC", issued in connection with related European Patent Application No. 08153656.7 dated Sep. 23, 2009.
"Communication Pursuant to Article 94(3) EPC dated Feb. 12, 2009", issued by the European Patent Office in related European Patent Application No. 07824933.1.
"European Search Report dated Aug. 1, 2008 issued by the European Patent Office", in related EPO Application No. EP 08153651.8, Aug. 1, 2008.
"European Search Report dated Aug. 1, 2008 issued by the European Patent Office", in related EPO Application No. EP 08153654.2, Aug. 1, 2008.
"European Search Report dated Jul. 18, 2008 issued by the European Patent Office", in related EPO Application No. EP 08153656, Jul. 18, 2008.
"European Search Report dated Jul. 18, 2008 issued by the European Patent Office", in related EPO Application No. EP 08153658, Jul. 18, 2008.
"International Search Report and Written Opinion of International Searching Authority dated Sep. 19, 2008", in related International Application PCT/GB 2007/050723, Sep. 19, 2008.
"Invitation to Pay Additional Fees and Communication Relating to the Results of the Partial International Search dated Apr. 28, 2008", in corresponding International Application PCT/GB 2007/050723, Apr. 28, 2008.
"Notice of Allowability issued Dec. 15, 2009", in a related U.S. Appl. No. 12/075,986, Dec. 15, 2009.
"Office Action dated Apr. 28, 2009", issued in related U.S. Appl. No. 12/075,986 (16 pages), Apr. 28, 2009.
"Office Action dated May 28, 2009", issued in related U.S. Appl. No. 12/075,998 (10 pages), May 28, 2009.
"Office Action dated Mar. 10, 2009", issued in related U.S. Appl. No. 12/075,999 (14 pages), Mar. 10, 2009.
"Office Action dated May 7, 2009", issued in related U.S. Appl. No. 12/156,598 (12 pages), May 7, 2009.
"Office Action Issued Apr. 15, 2011", in related U.S. Appl. No. 11/888,880 (12 pages).
"Office Action issued from the USPTO dated Jul. 10, 2009", issued in related U.S. Appl. No. 12/156,598 (9 pages), Jul. 10, 2009.
"Office Action issued from the USPTO dated Jul. 2, 2009", issued in related U.S. Appl. No. 12/075,986 (17 pages), Jul. 2, 2009.
"Office Action Issued Jan. 5, 2011", in related U.S. Appl. No. 11/888,880 (11 pages).
"Search Report under Section 17 dated Mar. 2, 2008", issued in related U.K. Patent Application GB 0802196.6, Mar. 2, 2008.
"U.K. Search Report under Section 17 dated Mar. 18, 2008", in connection with U.K. Application No. GB 0802366.5 (1 page), Mar. 18, 2008.
"United Kingdom Search Report under Section 17 dated Sep. 15, 2007", in connection with GB 0709604.3, Sep. 15, 2007.
"International Preliminary Report on Patentability and Written Opinion of the International Searching Authority issued Nov. 24, 2009", in International Application PCT/EP 2008/056084, Nov. 24, 2009.
Gerard Salton, J. Allan, and Christopher Buckley, "Approaches to Passage Retrieval in Full Text Information Systems," Proceedings of SIGIR ''93, pp. 49-58 (Jun. 1993).
Danilo Fum, Giovanni Guida, and Carlo Tasso, "Forward and Backward Reasoning in Automatic Abstracting," Coling 82: Proc. 9th Int. Joint Conf. on Computational Linguistics, Amsterdam: North-Holland, pp. 83-88 (1982).
Klaus Zechner, "Automatic Text Abstracting by Selecting Relevant Passages," M.Sc. Dissertation, Centre for Cognitive Science, University of Edinburgh, UK (1995).
Kavi Mahesh, "Hypertext Summary Extraction for Fast Document Browsing," AAAI Technical Report SS-97-02, pp. 95-103 (1997).
Davies, N.J., Weeks R., Revett, M.C. "Jasper: Communication Information Agents for WWW." Proc. Int. Conf. On WorldWideWeb, Boston, USA (1995).
Keith Preston and Sandra Williams, "Managing the Information Overload," Physics in Business, p. 2 (1994).
Seji Miike, Etsuo Itoh, Kenji Ono, and Kazuo Sumita, "A Full-Text Retrieval System with a Dynamic Abstract Generation Function," In W. Bruce Croft and C.J. van Rijsbergen, editors, Proceedings of Seventeenth Annual International ACM SIGIR Conference on Research and Development in Information Retrieval, pp. 152-161 (Jul. 1994).
Gerard Salton and Christopher Buckley, "Term-Weighting Approaches in Automatic Text Retrieval," Information Processing & Management, vol. 24, No. 5, pp. 513-523 (1988).

(56) References Cited

OTHER PUBLICATIONS

John Davies, Scott Stewart, and Richard Weeks, "Knowledge Sharing Agents Over the World Wide Web," British Telecom Tech., J., vol. 16, Nr. 3, pp. 104-109 (1988).

S.J. Soltysiak, and I.B. Crabtree, "Automatic Learning of User Profiles-Towards the Personalization of Agent Services," British Telecom Tech. J., vol. 16, Nr. 3, pp. 110-117 (1998).

http://www2.hawaii.edu/~rpeterso/engine_.htm.
http://www.monash.com/spidap3.html.
http://www.asis.org/annual-96/ElectronicProceedings/chu.html (Oct. 1996).
http:///www.yale.edu/engineering/eng-info/msg00038.html.
Robert Godin et al. "Design of a Browsing Interface for Information Retrieval", 12th Annual Int'l ACM SIGIR Conference on Research and Dev. in Info. Retrieval,(1989).

\* cited by examiner

\<meta name="Description" content="CNN.com delivers the latest breaking news and information on the latest top stories, weather, business, entertainment, politics, and more. For in-depth coverage, CNN.com provides special reports, video, audio, photo galleries, and interactive guides."\>

\<meta name="Keywords" content="CNN, CNN news, CNN.com , CNN TV, news, news online, breaking news, U.S. news, world news, weather, business, CNN Money, sports, politics, law, technology, entertainment, education, travel, health, special reports, autos, developing story, news video, CNN Intl"\>

\<meta name="description" content="In the wake of the tragic shootings at Columbine High School, some schools across the country turned themselves into near-fortresses."\>

\<meta name="SECTION" content="LIVING"\>\<meta name="SUBSECTION" content=""\>\<meta name="KEYWORDS" content="Public Finance, Economic Stimulus, Domestic Policy, Police, Federal Budget, William Modzeleski, Family, Parenting, Child Safety, Economic Policy, Columbine High School, Political Policy, Politics, Shootings, Culture and Lifestyle, School Shootings, Education, U.S. Department of Education, Fort Wayne, Government Spending"\>

FIG. 2a

MUSIC | MOVIEFONE
--- | ---
section ▼ | clips

Distinct terms in Tag  6200
TOP 40   ╭302  ╭306

| Word | TFIDF | Term Freq_Tag | Term Freq_Doc | Distinct Tag_Count | Distinct Doc_Count |
|---|---|---|---|---|---|
| heroes | 0.5884 | 10 | 32 | 1 | 4 |
| sleeping | 0.3641 | 8 | 37 | 2 | 8 |
| uk tabloid newspapers | 0.3584 | 6 | 16 | 1 | 4 |
| sept | 0.2729 | 6 | 50 | 1 | 5 |
| shrine auditorium | 0.2469 | 14 | 26 | 2 | 8 |
| directed | 0.2274 | 9 | 18 | 1 | 9 |
| sin | 0.2236 | 13 | 32 | 4 | 16 |
| reads | 0.2182 | 6 | 18 | 2 | 8 |
| laurens | 0.2157 | 9 | 40 | 3 | 12 |
| ancient | 0.2148 | 6 | 26 | 2 | 8 |
| grounds | 0.2143 | 10 | 27 | 3 | 12 |
| marries | 0.2019 | 12 | 40 | 4 | 16 |
| army | 0.1994 | 3 | 40 | 1 | 4 |
| teen | 0.1986 | 9 | 35 | 2 | 10 |
| arrives | 0.1938 | 18 | 28 | 2 | 18 |
| catholic | 0.1929 | 14 | 52 | 4 | 20 |
| afghanistan | 0.1878 | 11 | 45 | 4 | 16 |
| corruption | 0.187 | 9 | 25 | 1 | 4 |
| law enforcement official | 0.1755 | 18 | 36 | 5 | 25 |
| racial | 0.1729 | 11 | 52 | 9 | 18 |
| howard | 0.1632 | 18 | 60 | 6 | 30 |
| dancing | 0.1609 | 4 | 23 | 1 | 6 |
| poster | 0.1605 | 5 | 17 | 2 | 8 |
| apple | 0.1604 | 4 | 32 | 3 | 12 |
| redneck shop | 0.1589 | 7 | 40 | 3 | 12 |
| fans | 0.1581 | 32 | 46 | 3 | 18 |
| dec | 0.1579 | 15 | 30 | 3 | 15 |
| cools | 0.1504 | 0 | 10 | 1 | 0 |
| supports | 0.1561 | 6 | 67 | 2 | 14 |
| sms | 0.1557 | 0 | 62 | 2 | 14 |
| fair | 0.1556 | 19 | 52 | 4 | 20 |
| irresponsible | 0.154 | 4 | 26 | 2 | 0 |
| sisters | 0.1537 | 2 | 29 | 1 | 4 |
| fun fact | 0.1528 | 10 | 30 | 1 | 5 |
| emmy | 0.1522 | 19 | 46 | 4 | 24 |
| space | 0.1504 | 1 | 29 | 1 | 4 |
| enjoyed | 0.1504 | 1 | 23 | 1 | 4 |
| economy | 0.146 | 9 | 40 | 3 | 12 |
| talling | 0.1459 | 2 | 23 | 1 | 4 |
| royal | 0.1456 | 5 | 21 | 3 | 12 |

FIG. 3

| |
|---|
| Home:_General |
| Home:Decorating |
| Home:Entertaining |
| Home:Family:_General |
| Home:Family:Parent:_General |
| Home:Family:Parent:NewBorn |
| Home:Family:Parent:Pregnancy |
| Home:Family:Pets:_General |
| Home:Family:Wedding |
| Home:Food:_General |
| Home:Food:Cooking |
| Home:Food:Wine |
| Home:Garden |
| Home:Holidays:_General |
| Home:Imorovement |
| Home:_Other |
| Mobile:_General |
| Mobile:Mobile Applications:_General |
| Mobile:Mobile Applications:Books |
| Mobile:Mobile Applications:Business |
| Mobile:Mobile Applications:Education |
| Mobile:Mobile Applications:Entertainment |
| Mobile:Mobile Applications:Finance |
| Mobile:Mobile Applications:Games |
| Mobile:Mobile Applications:Health & Fitness |
| Mobile:Mobile Applications:Lifestyle |
| Mobile:Mobile Applications:Local |
| Mobile:Mobile Applications:Maps |
| Mobile:Mobile Applications:Medical |
| Mobile:Mobile Applications:Music |
| Mobile:Mobile Applications:Navigation |
| Mobile:Mobile Applications:News |
| Mobile:Mobile Applications:Photography |
| Mobile:Mobile Applications: Productivity |
| Mobile:Mobile Applications:Reference |
| Mobile:Mobile Applications:Social Networking |
| Mobile:Mobile Applications:Sports |
| Mobile:Mobile Applications:Travel |
| Mobile:Mobile Applications:Utilities |
| Mobile:Mobile Applications: Chat and IM |
| Mobile:Mobile Music |
| Mobile:Mobile Ringtones |
| Mobile:Mobile Video |

FIG. 4

INDEXING AND TAG GENERATION OF CONTENT FOR OPTIMAL DELIVERY OF INVITATIONAL CONTENT

BACKGROUND

1. Technical Field

The present disclosure relates to electronic content delivery and more specifically to intelligent targeting of invitational content based on enhanced knowledge of the context related to the primary content.

2. Introduction

Electronic content publishers commonly provide a description of their content. In some instances, the description is as simple as a contextual tag. For example, a news website or application might include the description "news." In other instances, a content provider might attempt to provide a more detailed description of the content in the way of collection of tags identified by the content publisher, for example, a cloud tag, which is commonly seen on websites on the Internet.

However, such content descriptions, if available, are often overly broad or inaccurate. While such descriptions might be suitable for their intended purpose of aiding search engines in finding the content, they are not sufficient for distribution of secondary content to be displayed along with the publisher's content.

SUMMARY

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides mechanisms for delivering optimally targeted invitational content to a user by a content delivery system. One aspect of providing optimally targeted content includes providing the content delivery system with detailed and accurate information regarding the context in which the content is being requested and to be displayed.

To better understand the present technology, the following hypothetical example is useful. A primary content developer hosts a website, which the primary content developer tags as a news website. However, a user browsing content on the website is reviewing a webpage that contains sports content. When the user's device requests an item of secondary content to be displayed along with the sports content, the system will send secondary content that fits the news context, which is not ideal for sports content. Accordingly, the present technology remedies this problem by analyzing the individual web pages to gain more detailed and accurate contextual information regarding the primary content. This, in turn, results in the distribution of secondary content that is more appropriate for the context of the primary content.

In some embodiments, a device displaying an item of primary content (e.g. a website or application, etc.) will request targeted-secondary content from the content delivery system for display along with the primary content. In such embodiments, the content delivery system can take into account many different factors in determining which item of secondary content is most likely to be of interest to the user of the device. Such factors include known characteristics of the user, the device, the context in which the secondary content will be displayed, etc.

With respect to the context in which the secondary content will be displayed, the content delivery system can look up contextual tags provided by the content publisher such as html tags or tag clouds. However, such tags are often too vague and inaccurate. Accordingly, the content delivery system analyzes primary content to determine additional and more accurate contextual information regarding the primary content. The enhanced knowledge of the primary content is used to associate secondary content therewith.

In some embodiments, the analysis of the primary content comprises a text analysis of the primary content. The textual terms can be thereafter be used to correlate the primary content to an index maintained by the content delivery system. In some embodiments, only the most relevant textual terms are used to correlate the primary content to the index. The relevance of terms can be determined by a variety of mathematical techniques. However, in at least some embodiments, the relevance is determined by a frequency distribution of similar terms.

The secondary content is also correlated to the index. In some embodiments, this can be done manually when the content is loaded into the content delivery system, or it can also be analyzed in a similar fashion as described for the primary content above.

By correlating both the primary content and the secondary content to the index, the content delivery system can be ensured of delivering secondary content that fits the context of the primary content.

Toward that end, in one aspect, the disclosure concerns a computer-implemented method for improving the conversion rate of secondary content that is provided to the user of an interactive, content-receiving-and-displaying device. According to this aspect, the content of a multiplicity of primary-content sources is analyzed and keyword and/or other context-providing information is extracted from the primary-content sources. The keyword and/or other context-providing information is used to index the primary-content sources into an index according to a hierarchical taxonomy; the hierarchical taxonometric index is used to identify primary-content sources with which a given item of invitational content correlates; and the given item of invitational content is delivered to a user in response to the user accessing a primary-content source with which the given item of invitational content correlates.

In another aspect, the disclosure concerns a server, and/or a system, which implements the method described above. In yet another aspect, the disclosure concerns a software product with instructions for implementing the method described above.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure, and are not therefore to be considered to be limiting of its scope, the principles herein are described and explained with additional specificity and detail through the use of the accompanying drawings in which:

FIG. 2a is an excerpt from FIG. 2 showing exemplary information contained within metadata associated with a website or webpage;

FIG. 4 is an exemplary hierarchical taxonometric index; and

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of selecting targeted content presented to a user based on characteristics descriptive of the user and/or the user's interaction with one or more items of targeted content.

Figure 1:
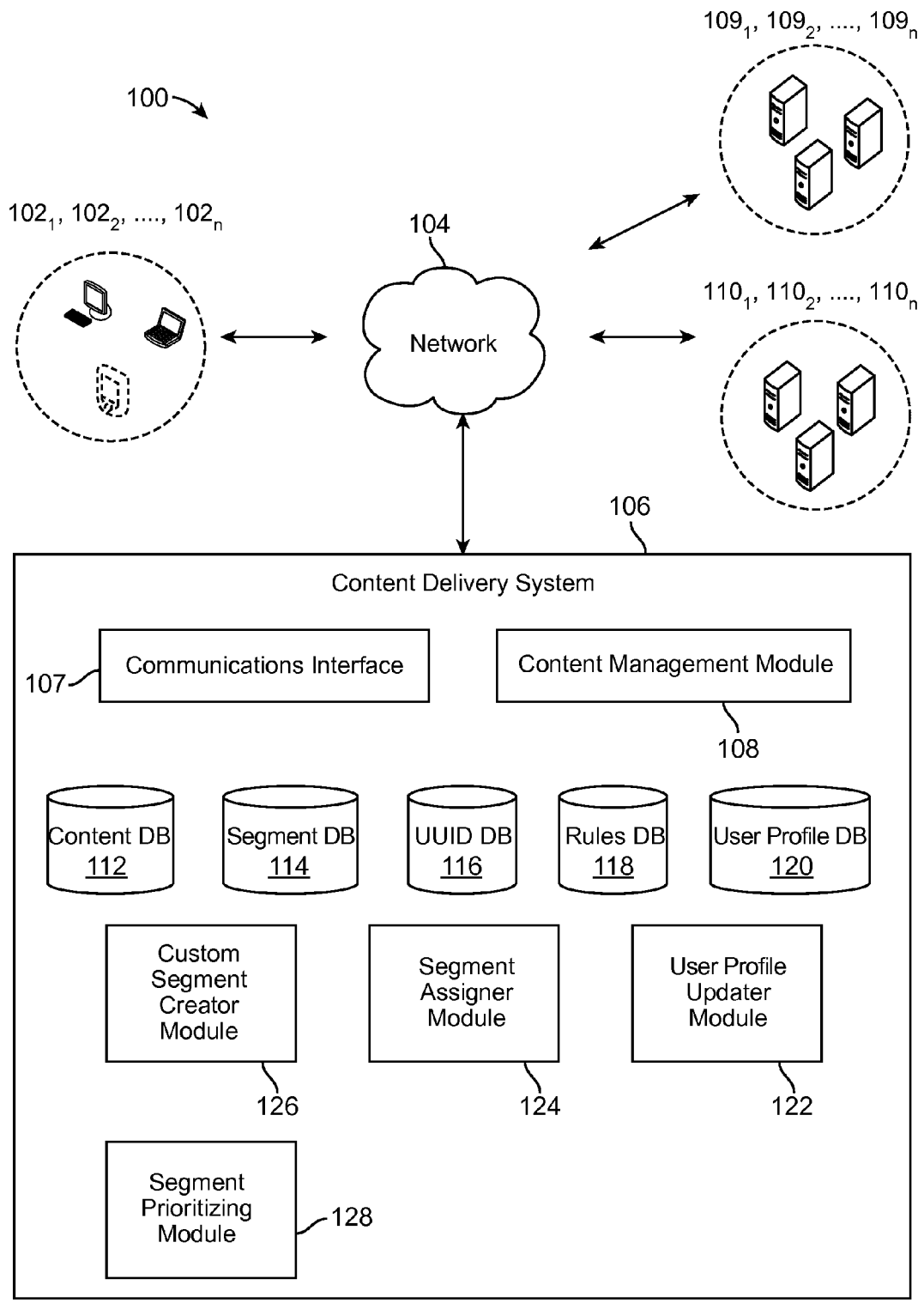
FIG. 1 illustrates an exemplary configuration of devices and a network.

The presently disclosed system and method is particularly useful for delivering targeted invitational content to a user in a manner that leads to a higher probability of conversion. An exemplary system configuration 100 is illustrated in FIG. 1, wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, secondary content is delivered to user terminals $102_1$ ... $102_n$ (collectively "102") connected to a network 104 by direct and/or indirect communications with a content delivery system 106. In particular, the content delivery system 106 receives a request for an item of electronic content, such as a web page, an application, or media, etc., from one of user terminals 102. Thereafter, the content delivery system 106 assembles the secondary content into a content package in response to the request and transmits the assembled content package to the requesting one of user terminals 102. In some cases, the server will have preselected the content package before the request is received. The assembled content package can include text, graphics, audio, video, executable code, or any combination thereof.

Further, the assembled content packages can include invitational content designed to inform or elicit a pre-defined response from the user and content that can vary over time. In the various embodiments, one or more types of invitational content can be combined in a content package. The invitational content can include text, graphics, audio, video, executable code or any combination thereof. In some embodiments, the invitational content can be associated with a product or can directly or indirectly advertise a product. In some embodiments, the content package can be configured to replace or update invitational content in a content package already delivered to the user terminal.

Further, the invitational content can be active invitational content in that it is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content that is designed to primarily inform the user. In some cases, passive invitational content can include information that can lead or direct users to active invitational content. Additionally, the invitational content can be dynamic invitational content, i.e., invitational content that varies over time or that varies based on user interaction with the invitational content. Alternatively, the invitational content can be static invitational content that does not vary over time and does not vary based on user interaction. In the various embodiments, an item of invitational content in a content package can be static or dynamic and active or passive. Further, various types of invitational content can be combined in a same content package.

As noted above, having the content that is available to be delivered to the user well organized, e.g., by appropriate tagging and indexing, is also valuable in matching and delivering content to a given user in a manner that optimizes the likelihood of conversion of the content. In this regard, it is known that content providers and publishers often generate their own tags and metadata that are associated with the information they provide. However, in order to improve the "match" between the user and the invitational content delivered to the user thereby intended to increase the likelihood of conversion of the invitational content, the present disclosure contemplates that an independent (i.e., non-publisher-based, non-provider-based) analysis of available content can be conducted.

Figure 2:
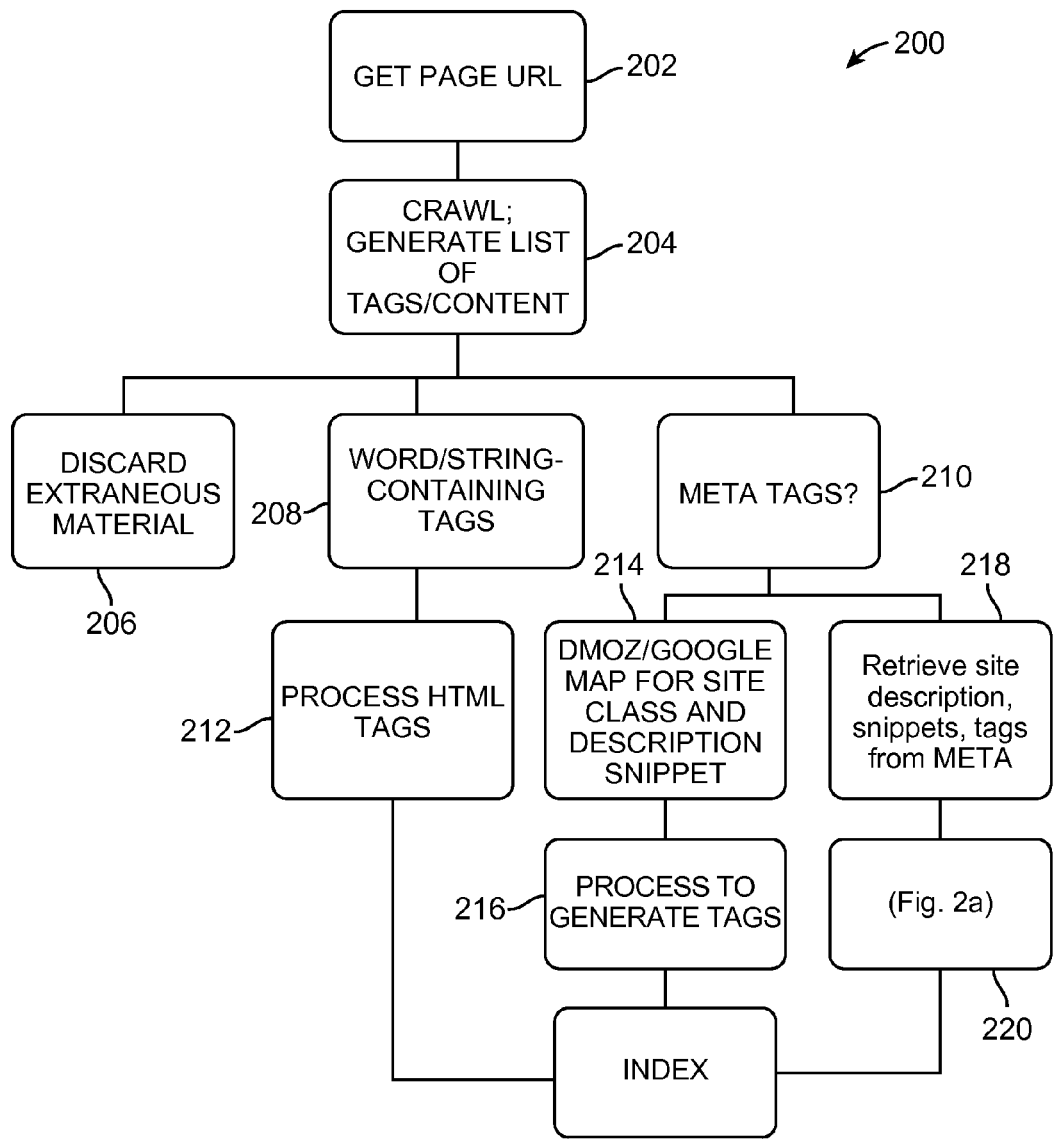
FIG. 2 illustrates, in overview, an exemplary method for indexing and tagging content of primary-content sources.

FIG. 2 is a flowchart illustrating broadly, or in overview fashion, steps in an exemplary method 200 for indexing and tagging the content of a large number of primary-content sources, so that invitational content with the greatest interest to a user can be delivered. Although specific steps are shown in FIG. 2, in other embodiments a method can have more or less steps than shown.

Thus, for every source of primary content to be analyzed, e.g., a website—that is, a general place on the Internet one might visit as a "gateway" destination, such as CNN.com or ESPN.com, to which the user will go as a starting point for further information—or a specific webpage (i.e., the specific page associated with a specific URL), according to the method 200, the system 100 will obtain the source's URL 202 and "crawl" the source 204 to extract the necessary information/data from it in order to index the source. More particularly, the system will analyze (e.g., text-process) the primary-content source and look for extraneous material to be ignored or discarded 206; words and/or strings 208 containing tags that have already been provided by the content publisher/provider; and metadata 210 associated with the primary-content source. (Extraneous material includes terms that appear frequently (e.g., "the," "a"/"an," "to," "and," etc.) and that carry no meaningful substantive or contextual information with them.) Furthermore, the system 100 can "stem" the various terms, that is, convert them into the base forms of the words by eliminating suffixes (e.g., "s" or "es," "ed," "ing," etc.). Additionally, the system 100 can "normalize" the terms, e.g., by converting them all to lowercase letters, etc. In some embodiments, the delivery system 106 can use the individual terms to infer/derive additional terms and/or use the terms to identify other terms known to the delivery system 106.

Where the primary-content source already contains word tags and/or string tags that have been prepared and provided by the content provider (208), the system 100 can extract the various tags directly and index the source by processing the HTML tags (212), as described more fully below. Web pages are a commonly encountered example of content that are frequently annotated to improve search results for the purpose of providing contextual information to a content delivery system, such as system 106.

Alternatively, if the primary-content source has metatags associated with it (210), two "avenues" of processing, which are not mutually exclusive, are available. According to one avenue, the primary-content source will be mapped to its pre-existing descriptive snippets (sometimes referred to as "tag bags") using an offline retrieval method such as GOOGLE searching and/or DMOZ searching (214) to obtain the source's site class and/or a descriptive snippet, and that information is processed (216) to generate textual tags that can be indexed, as described more fully below. On the other hand, the metadata itself often contains textual information that can be retrieved (218) and processed (220) to extract and generate textual tags that can be indexed. Exemplary textual information that can be found directly in the metadata is illustrated in FIG. 2a.

In some cases, the primary content may be annotation/tag free. To associate contextual information or textual tags with such primary content, the delivery system 106 can analyze the content. More particularly, the system can parse the primary-content source into individual terms. The granularity of the individual terms can vary with the configuration of the delivery system 106. For example, in some configurations, the delivery system can parse the content so that each word in the content is mapped to an individual term. Alternatively, an individual term can represent a phrase, idea, etc. In some configurations, the delivery system 106 can analyze sub-content, such as figures or images, to identify individual terms.

In some embodiments, the delivery system 106 can determine the contextual information from the tags/metadata provided by the content provider and independently analyze the content. The analysis can be used to verify the information provided by the content provider. The independent analysis can also be used to assign a confidence score to the contextual information provided by the content provider. For example, the delivery system 106 may assign a low confidence score to the contextual information provided by the content provider. However, a higher confidence score could be assigned to tags in the content that are a close match to the independently discovered information.

Once the various textual tags for a given source of primary content have been determined, the page is indexed by mapping those tags according to a pre-established hierarchical taxonometric index. For example, an exemplary list of textual tags that might be extracted from a given source of primary content is shown in FIG. 3, and an exemplary hierarchical taxonometric index is illustrated in FIG. 4.

Figure 3:
FIG. 3 is an exemplary listing of tags that have been extracted from a source of primary content.

FIG. 3 illustrates a term-frequency distribution table that is the result of the analysis of the primary content. In table 302 the top forty terms are listed in order of relevance. A relevancy score 306 can be determined for the various extracted tags. In this regard, each piece of content will have generated a "semantic score" that provides a general sense as to what the piece of content relates to, or "is about," in the form of a term vector/matrix and its probabilities. The term "heroes" appears 32 times in the analyzed document and 10 times in the documents tag fields. While other terms appear more frequently, a term frequency-inverse document frequency analysis weights "heroes" as the most relevant term in the document. Conversely, table 304 lists the bottom forty terms in the document.

By way of example, the methodology used in determining the relevancy score may be either term frequency-inverse document frequency or any clustering method such as k-means, nearest-neighbor, fuzzy clustering, latent-semantic indexing (see, for example, http://www.activemath.org/am-wiki/index.php/Latent-Semantic-Algorithms), SVD (singular value decomposition), LDA (latent Dirichlet Allocation), etc. (More information on this topic can be found, for example, at http://en.wikipedia.org/wiki/Cluster_analysis.)

FIG. 4 illustrates the various broad classes, subclasses, sub-subclasses, etc., into which the content available from a given source might be categorized. Notably, the exemplary hierarchical index shown in FIG. 4 accounts for the particular channel used to deliver the content to a user, e.g., by drawing a distinction between content from a mobile-specific site, as opposed to content from the ordinarily "wired" site viewed on a mobile device. This is because the context, and hence the import, of the content from a given content source can vary depending on the channel used to deliver the content.

Additionally, invitational content can have metadata and/or text associated with it, and the same process is performed for it, too. In other words, the invitational content can also be analyzed to determine its context just as described for the primary content above. In some embodiments, this might not be required to analyze the invitational content, such as instances in which the invitational content is assigned to the proper context(s) when uploaded to the content delivery system.

Once the tags have been extracted and analyzed, and the primary-content source has been indexed, the top, say, five or ten (or some other predetermined number) most contextually relevant tags are passed on to a targeting module. Additionally, in some embodiments, tags, which the content publisher has provided, can be used in the process. The targeting module uses those tags to identify primary-content sources to which invitational content to be delivered to a user optimally correlates or corresponds. In that way, when a user accesses a primary-content source with which a given item of invitational content correlates, the system 106 delivers the invitational content to the user, along with the primary content to be displayed along with it.

The content delivery system can determine that the primary content corresponds with the secondary invitational content because both the primary and the secondary content are assigned to the correlated item in the hierarchical taxonometric index of content contexts, such as the exemplary hierarchical taxonometric index illustrated in FIG. 4.

Contexts of content can be said to be correlated when their contexts are associated so that placing secondary content having one context does not seem out of place to a user when placed with primary content having another context. One method of correlating contexts is to perform a cluster analysis of the available contexts. Any contexts that are grouped into the same or related cluster can be correlated.

Referring back to FIG. 1, the content delivery system can include a communications interface 107 to facilitate communication with the user terminals 102 and any other components familiar to those of ordinary skill in the art.

The content delivery system 106 includes a content management module 108 that facilitates generation of the assembled content package, which can include invitational content. Specifically, the content management module can combine content from one or more primary content providers $109_1 \ldots 109_n$ (collectively "109") and content from one or more secondary content providers $110_1 \ldots 110_n$ (collectively "110") to generate the assembled content package for the user terminals 102. For example, in the case of a web page being delivered to a requesting one of user terminals 102, the content management module 108 can assemble a content package by using the contextual data for the web page to match the web page with secondary content that fits the context of the web page.

In some embodiments, the primary content and the secondary content are sent to the user device in separate communications and combined at the device. Such a scenario is possible when the device accesses primary content directly from the primary content provider and subsequently/simultaneously requests secondary content from the content delivery network to be displayed with the primary content on the device.

Although primary and secondary providers 109 and 110 are presented herein as separate entities, this is for illustrative purposes only. In some cases, the primary and secondary providers 109 and 110 can be the same entity. Thus, a single entity can define and provide both the primary and the secondary content.

Although the content management module 108 can be configured to request that content be sent directly from content providers 109 and 110, a cached arrangement can also be used to improve performance of the content delivery system 106, and improve overall user experience. That is, the content delivery system 106 can include a content database 112 for locally storing/caching content maintained by content providers 109 and 110. The data in the content database 112 can be refreshed or updated on a regular basis to ensure that the content in the database 112 is up to date at the time of a request from a user terminal. However, in some cases, the content management module 108 can be configured to retrieve content directly from content providers 109 and 110 if the metadata associated with the data in content database 112 appears to be outdated or corrupted.

In the various embodiments, the content delivery system 106 can also include a unique user identifier (UUID) database 116 that can be used for managing sessions with the various user terminal devices 102. The UUID database 116 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 116. The delivery system 106 can analyze the attributes of requesting devices to determine whether such requests can be attributed to the same device. Such attributes can include device or group-specific attributes.

As described above, content maintained by the content providers 109 and 110 can be combined according to a pre-defined arrangement between the two content providers, which can be embodied as a set of rules. In an arrangement where the content delivery system assembles the content package from multiple content providers, these rules can be stored in a rules database 118 in content delivery system 106. The content management module 108 can be configured to assemble the content package for user terminals 102 based on these rules. The rules specify how to select content from secondary content providers 110 and primary content providers 109 in response to a request from one of user terminals 102. For example, in the case of a web page maintained by one of primary content providers 109 and including variable advertisement portions, the rules database 118 can specify rules for selecting one of the secondary providers 110. The rules can also specify how to select specific content from the selected one of secondary providers 110 to be combined with the content provided by one of primary providers 109. Once assembled, the assembled content package can be sent to a requesting one of user terminals 102. However, the content package is not limited to the content from content providers 109 and 110. Rather, the content package can include other data generated at the content delivery systems 106.

One concern with the arrangement typically entered into by secondary content providers 110 is that they can result in invitational content of little or no interest being presented to users. As a result, even though a desired number of impressions can be achieved, the rate of response to such invitational content may be low and/or the resulting targeted audience may be incorrect or suboptimal.

As used herein, the term "user characteristics" refers inclusively to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind, including characteristics indicative of how likely a user is to click on or convert an item of invitational content if it were displayed to the user.

Furthermore, in some embodiments, the content delivery system 106 can include a user-profile database 120. The user-profile database 120 can, at least in part, be constructed based on recorded user characteristics related to one or more users. In some cases, the user-profile database may contain uncertain or incomplete user characteristic values.

The user-profile database 120 can be updated using a user-profile-updater module 122. In some embodiments, the user-profile-updater module 122 can be configured to add additional profile data, update profile data, fill in missing profile data, or derive uncertain user characteristic values from trusted data.

The updater module 122 can also be configured to maintain the profile database 120 to include only more recently acquired data, or to re-derive any uncertain characteristics in order to ensure that the user profile is an accurate reflection of the current state of the user (location, state of mind, behaviors, demographics, etc. can change rapidly). For example, the updater module 122 can be configured to maintain the profile database 120 to include only data from the last two to three months. However, the updater module 122 can be configured to adjust the data in profile database 120 to cover any span of time. In some instances, the updater module 122 can update the profile database 120 in real-time. In some instances, the updater module 122 can update the profile database 120 at least every week, or every day. In some cases, the delivery system 106 can receive a direct request to update one or more user profiles. The update request can come directly from the user's device or any other device capable of communicating with the delivery system 106, such as other content delivery networks or websites. In some cases, the delivery system 106 can receive an indirect request to update one or more user profiles. An indirect request can be the result of receiving new user characteristic values. An update request can occur at any time.

In some embodiments, the content delivery system 106 can include a segment database 114 that is used to aid in selecting invitational content to target to users. The segment database 114 stores defined segments and associations between the segments and users and/or invitational content that should be targeted to users associated with the segments. As described above, a targeted segment can be defined based on one or more user characteristics or derivatives thereof, and can be associated with one or more items of invitational content. Additionally, a targeted segment can be associated with one or more users. In some embodiments, by associating a targeted segment with both a user and an item of invitational content, the delivery system can match invitational content with users. In some embodiments, the delivery system 106 can update the segment database 114 to add newly defined targeted segments or to delete targeted segments.

In some embodiments, the delivery system 106 can include a custom segment creator module 126. A content provider 109 and 110 can interact either directly or indirectly with the creator module 126 to define a custom targeted segment. A custom segment can be defined based on one or more user characteristics known to the delivery system 106. In some cases, a custom targeted segment can be saved to the segment database 114 to use later in selecting invitational content. Alternatively, the custom targeted segment can be used immediately to identify invitational content with or without saving the segment to the segment database 114.

In some embodiments, the content delivery system 106 can provide a segment assigner module 124. The segment assigner module 124 can apply a set of user characteristics associated with a user (including segments to which a user has been previously assigned) to assign the user to one or more targeted segments. The assigner module 124 can obtain the set of user characteristic values from the user profile database 120 and/or from the user's activities during the current session. The segment assigner module 124 can assign a user to one or more defined targeted segments in the segment database 114, or alternatively, a user can be assigned to a custom targeted segment defined to meet specific goals of a content provider.

Based on the assigned segments, the user profile database 120 can be updated to reflect the segment assignments. Additionally, the delivery system 106 can use the segment assignments to select targeted content. In some cases, the user profile data in the user profile database 120 can change over time, so the segment assigner module 124 can be configured to periodically update the segment assignments in the user profile database 120. The segment assignment update can be triggered at specified intervals, upon detection of a change in the user profile database 120, and/or upon detection of a specified activity in the delivery system 106.

In some embodiments, the content delivery system 106 can provide a segment-prioritizing module 128 for ordering the targeted segments assigned to a user. The prioritization can be influenced by a number of factors, which include the user's context (state of mind of a user with respect to interest in certain types of content, subject matter of content, progress along a conversion continuum, etc.), a content provider's campaign goals, and/or content that is currently available for display to the user. A request to prioritize the targeted segments can be made explicitly or implicitly by any component in the system 100. For example, a secondary content provider 110 can explicitly request that the content delivery system 106 prioritize the targeted segments or the request can be implicit as part of a request for an assembled content package. The resulting prioritized list can be provided, for example, to the content management module 108, which can then use the information to assemble and deliver a content package. Additionally, the prioritized list can be stored, for example in the user profile, for later use. A method of prioritizing targeted segments is described in greater detail.

In the various embodiments, the one or more databases described herein can be implemented using any type of data structures. Such data structures include, but are not limited to, data structures for relational databases, key/value stores, graph databases, hierarchical databases, and distributed or columnar stores. Accordingly, although the various embodiments described herein may refer to specific data structures, in other embodiments, such data structures can be substituted for any other type of data structure.

As described above, one aspect of the present technology is the gathering and use of data available from various sources to improve the delivery of advertisements or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, social media ID's such as TWITTER ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content, and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

In some embodiments, the delivery system 106 is configured to assign users to a targeted segment of the user population. Accordingly, a segment assigner module 124 can be provided for performing the assignments. The delivery system 106 can also include a segment database 114 that stores previously defined targeted segments. The previously defined targeted segments can be based on channel, demographic, behavioral, and/or spatial-temporal characteristics. The definition of a targeted segment can include one or more user characteristics. For example, a targeted segment can be defined to target a segment of the population shaped by gender and age. Additionally, a user characteristic value for a characteristic can be a single value, multiple values, a range of values, multiple ranges of values, or any combination thereof. For example, for the age characteristic, acceptable values include 19; 19-24; 25-29; etc. In some embodiments, a user characteristic value can be a wildcard value, which indicates that any value is an acceptable match for the user characteristic.

Having defined segments to work with, the assigner module 124 can analyze one or more user characteristic values and one or more targeted segment definitions to determine if the user fits within a population segment defined by a targeted segment. The delivery system 106 can then use the segment assignments to select invitational content targeted at the assigned segment to send to the user.

Figure 5:
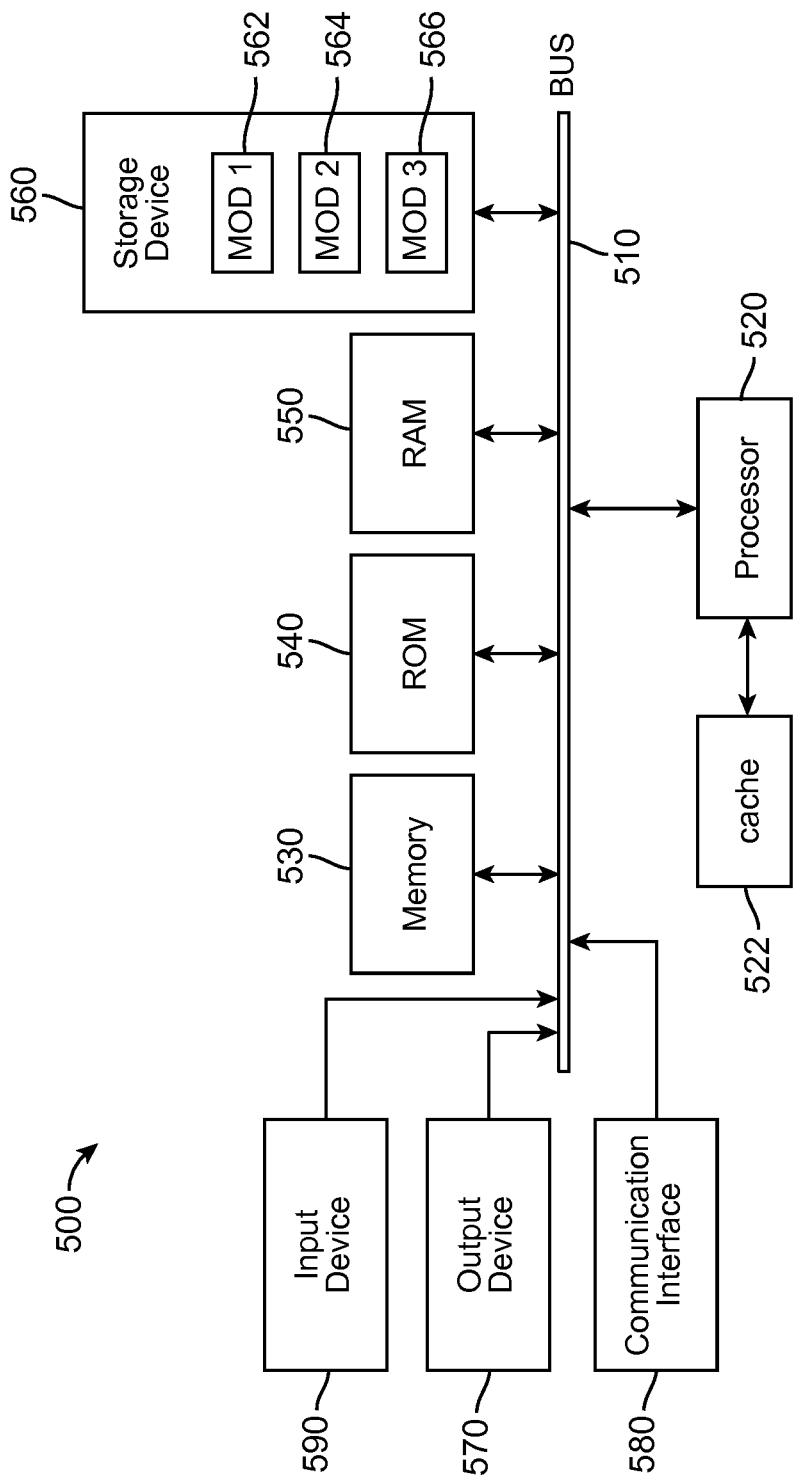
FIG. 5 illustrates an example system embodiment.

As shown in FIG. 5, an exemplary system 500 includes a general-purpose computing device 500, including a processing unit (CPU or processor) 520 and a system bus 510 that couples various system components, including the system memory 530, such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache 522 provides a performance boost that avoids processor 520 delays while waiting for data. These and other modules can be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures, including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560, such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer readable storage media provide nonvolatile storage of computer readable instructions, data structures, program modules and other data for the computing device 500. In one aspect, a hardware module that performs a particular function includes the software component stored in a non-transitory computer-readable medium in connection with the necessary hardware components, such as the processor 520, bus 510, output device 570, and so forth, to carry out the function. The basic components are known to those of skill in the art and appropriate variations are contemplated depending on the type of device, such as whether the device 500 is a small, handheld computing device, a desktop computer, or a computer server.

Although the exemplary embodiment described herein employs the hard disk 560, it should be appreciated by those skilled in the art that other types of computer readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example, the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry, in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. Such logical operations can be implemented as modules configured to control the processor 520 to perform particular functions according to the programming of the module. For example, FIG. 5 illustrates three modules Mod1 562, Mod2 564 and Mod3 566, which are modules controlling the processor 520 to perform particular steps or a series of steps. These modules may be stored on the storage device 560 and loaded into RAM 550 or memory 530 at runtime, or may be stored, as would be known in the art, in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein, without following the example embodiments and applications illustrated and described herein, and without departing from the spirit and scope of the disclosure.

The invention claimed is:

1. A method comprising:
   analyzing, by a processor, a first content of a primary-content source to identify at least a first term from the first content determined to be relevant to the primary-content source based on a number of times the first term appears in the first content, wherein analyzing the first content comprises:
      text-processing the first content to identify non-extraneous terms;
      ignoring extraneous terms determined to carry no meaningful substantive or contextual information;
      converting the non-extraneous terms into their base form by eliminating suffixes;
      normalizing the non-extraneous terms to lowercase letters; and
      determining a number of times each of the non-extraneous terms appears in the first content;
   analyzing, by the processor, a second content of an invitational content item to identify at least a second term from the second content determined to be relevant to the invitational content item based on a number of times the second term appears in the second content;

determining, by the processor, that primary-content source and the invitational content item are correlated when the primary-content source is assigned to a first index category in a predetermined hierarchical taxonomy based on the first term and the invitational content item is assigned to the first index category in the predetermined hierarchical taxonomy based the second term; and when the primary-content source and the invitational content item are correlated, delivering, by the processor, the invitational content item to a user in response to the user accessing the primary-content source.

2. The method of claim 1, wherein the first index category in the predetermined hierarchical taxonomy is associated with at least one target term.

3. The method of claim 2, further comprising:
comparing the first term to the at least one target term associated with the first index category in the predetermined hierarchical taxonomy; and
upon a determination that the at least one target term includes the first term, assigning the primary-content source to the first index category in the predetermined hierarchical taxonomy.

4. The method of claim 2, further comprising:
comparing the second term to the at least one target term associated with the first index category in the predetermined hierarchical taxonomy; and
upon a determination that the at least one target term includes the second term, assigning the invitational content item to the first index category in the predetermined hierarchical taxonomy.

5. The method of claim 1, wherein the first term is the non-extraneous term determined to appear in the first content most frequently.

6. A content delivery system comprising:
a processor; and
a memory containing instructions that, when executed, cause the processor to:
analyze a first content of a primary-content source to identify at least a first term from the first content determined to be relevant to the primary-content source based on a number of times the first term appears in the first content, wherein analyzing the first content comprises:
text-processing the first content to identify non-extraneous terms;
ignoring extraneous terms determined to carry no meaningful substantive or contextual information;
converting the non-extraneous terms into their base form by eliminating suffixes;
normalizing the non-extraneous terms to lowercase letters; and
determining a number of times each of the non-extraneous terms appears in the first content;
analyze a second content of an invitational content item to identify at least a second term from the second content determined to be relevant to the invitational content item based on a number of times the second term appears in the second content;
determine that primary-content source and the invitational content item are correlated when the primary-content source is assigned to a first index category in a predetermined hierarchical taxonomy based on the first term and the invitational content item is assigned to the first index category in the predetermined hierarchical taxonomy based the second term; and
when the primary-content source and the invitational content item are correlated, deliver the invitational content item to a user in response to the user accessing the primary-content source.

7. The content delivery system of claim 6, wherein the first index category in the predetermined hierarchical taxonomy is associated with at least one target term.

8. The content delivery system of claim 7, wherein the instructions further cause the processor to:
compare the first term to the at least one target term associated with the first index category in the predetermined hierarchical taxonomy; and
upon a determination that the at least one target term includes the first term, assign the primary-content source to the first index category in the predetermined hierarchical taxonomy.

9. The content delivery system of claim 7, wherein the instructions further cause the processor to:
compare the second term to the at least one target term associated with the first index category in the predetermined hierarchical taxonomy; and
upon a determination that the at least one target term includes the second term, assign the invitational content item to the first index category in the predetermined hierarchical taxonomy.

10. The content delivery system of claim 6, wherein the second term is the non-extraneous term determined to appear in the second content most frequently.

11. A non-transitory computer-readable medium containing instruction that, when executed by a computing device, cause the computing device to:
analyze a first content of a primary-content source to identify at least a first term from the first content determined to be relevant to the primary-content source based on a number of times the first term appears in the first content, wherein analyzing the first content comprises:
text-processing the first content to identify non-extraneous terms;
ignoring extraneous terms determined to carry no meaningful substantive or contextual information;
converting the non-extraneous terms into their base form by eliminating suffixes;
normalizing the non-extraneous terms to lowercase letters; and
determining a number of times each of the non-extraneous terms appears in the first content;
analyze a second content of an invitational content item to identify at least a second term from the second content determined to be relevant to the invitational content item based on a number of times the second term appears in the second content;
determine that primary-content source and the invitational content item are correlated when the primary-content source is assigned to a first index category in a predetermined hierarchical taxonomy based on the first term and the invitational content item is assigned to the first index category in the predetermined hierarchical taxonomy based the second term; and
when the primary-content source and the invitational content item are correlated, deliver the invitational content item to a user in response to the user accessing the primary-content source.

12. The non-transitory computer-readable medium of claim 11, wherein the first index category in the predetermined hierarchical taxonomy is associated with at least one target term.

13. The non-transitory computer-readable medium of claim 12, wherein the instructions further cause the computing device to:

compare the first term to the at least one target term associated with the first index category in the predetermined hierarchical taxonomy; and upon a determination that the at least one target term includes the first term, assign the primary-content source to the first index category in the predetermined hierarchical taxonomy.

14. The non-transitory computer-readable medium of claim 12, wherein the instructions further cause the computing device to:

compare the second term to the at least one target term associated with the first index category in the predetermined hierarchical taxonomy; and upon a determination that the at least one target term includes the second term, assign the invitational content item to the first index category in the predetermined hierarchical taxonomy.

15. The non-transitory computer-readable medium of claim 11, wherein the first term is the non-extraneous term determined to appear in the first content most frequently.

* * * * *